United States Patent
Wan et al.

(10) Patent No.: US 12,490,738 B2
(45) Date of Patent: Dec. 9, 2025

(54) PRO-MICROBIAL SURFACE

(71) Applicant: LULULEMON ATHLETICA CANADA INC., Vancouver (CA)

(72) Inventors: Lynn Yuqin Wan, Vancouver (CA); Robert John Gathercole, Vancouver (CA); Timothy Ryan McGee, Vancouver (CA)

(73) Assignee: LULULEMON ATHLETICA CANADA INC., Vancouver (CA)

( * ) Notice: Subject to any disclaimer, the term of this patent is extended or adjusted under 35 U.S.C. 154(b) by 551 days.

(21) Appl. No.: 18/011,785

(22) PCT Filed: Jun. 23, 2021

(86) PCT No.: PCT/CA2021/050863
§ 371 (c)(1),
(2) Date: Dec. 20, 2022

(87) PCT Pub. No.: WO2021/258205
PCT Pub. Date: Dec. 30, 2021

(65) Prior Publication Data
US 2023/0329233 A1  Oct. 19, 2023

Related U.S. Application Data

(60) Provisional application No. 63/042,820, filed on Jun. 23, 2020.

(51) Int. Cl.
| | | |
|---|---|---|
| A01N 25/34 | (2006.01) | |
| A01N 65/00 | (2009.01) | |
| A01N 65/20 | (2009.01) | |
| A01P 1/00 | (2006.01) | |
| A61K 35/74 | (2015.01) | |
| A61P 43/00 | (2006.01) | |
| A63B 6/00 | (2006.01) | |

(52) U.S. Cl.
CPC ............... *A01N 25/34* (2013.01); *A63B 6/00* (2013.01); *A63B 2209/00* (2013.01)

(58) Field of Classification Search
None
See application file for complete search history.

(56) References Cited

U.S. PATENT DOCUMENTS

| | | |
|---|---|---|
| 2015/0020939 A1 | 1/2015 | Katsuno et al. |
| 2020/0029760 A1 | 1/2020 | Seo et al. |

FOREIGN PATENT DOCUMENTS

| | | |
|---|---|---|
| CA | 2772362 A1 | 9/2012 |
| WO | 2001/52913 A1 | 7/2001 |

OTHER PUBLICATIONS

International Search Report for PCT Application No. PCT/CA2021/050863 dated Sep. 21, 2021.
Written Opinion for PCT Application No. PCT/CA2021/050863 dated Sep. 21, 2021.

*Primary Examiner* — Manjunath N Rao
*Assistant Examiner* — Jae W Lee

(57) ABSTRACT

Examples of a mat are disclosed. The mat comprises a body with a first surface and a second surface, and a microbial component that comprises pre-determined microorganisms which are dispersed in the body of the mat between the first and second surfaces, on one of the first surface or the second surface, or on both of the first surface and the second surface. The microbial component manipulates a microbiome of an environment adjacent or in contact to the mat. The microbial component can comprise at least one of live bacteria, bacteria endospores, fungi, viruses, protozoa, algae, slime moulds, archaea, micro-plants, a synthetic biology system or microbial precursor that stimulate growth of the desired microorganisms.

19 Claims, No Drawings

PRO-MICROBIAL SURFACE

TECHNICAL FIELD

The present disclosure relates to the field of floor mats, such as exercise mats, yoga mats or any other surface, and more specifically, to a surface treated with beneficial microorganisms or their precursors.

BACKGROUND

There is a diverse repertoire of microorganisms or microbiome, including bacteria, fungi, viruses and parasites that are present in various ecosystems, for example, outdoors, indoors, or on plants, animals, humans, etc. Such microbial life is very important in driving biological and biochemical processes in such ecosystems. Human microbiome resides on or within a number of human tissues and biofluids, such as skin, gastrointestinal tracts, oral cavity (oral mucosa), saliva, etc. Healthy human microbiome is associated with many beneficial physiological effects. For example, gastrointestinal or gut microbiome help with food digestion, as well as control of immune systems. A number of studies have found that environment has a bigger impact on an individual's microbiome than genetics. The outdoor microbiome itself is a conglomerate of diverse microorganisms living in nearby soil, air, plants, and water, and such outdoor microbiome is subject to wide fluctuations depending on environmental conditions like terrain conditions (for example, rural, urban, forest, or agricultural conditions) or climate conditions (for example, warm, cold, wet, dry). There is a strong relationship between the outdoor microbiome and human microbiome. For example, microbiome of an individual living in a rural area can be different than the microbiome of an individual living in urban area. With global urbanization and many urbanites spending most of their times indoors, the majority of microorganisms encountered by most humans will be those present in the indoor environment, such as indoor air and on various indoor surfaces.

A number of studies have shown that indoor microbiome can be shaped by occupants' microbiome and how the outdoor microorganisms enter and persist in the indoor environment. For example, naturally ventilated rooms tend to contain more similar microbiomes from the adjacent outdoor air to that of mechanically ventilated rooms. Skin microbiome generally has the most direct relationship with the immediate environment given the fact that humans shed approximately $10^7$ microorganisms per person per hour in indoor settings, so human presence and activity also contribute to the indoor environment microbiome. Compared to other indoor environments, public fitness facilities, such as gyms or yoga studios, are interesting from a microbial perspective because of the relatively high degree of physical surface contact by different individuals, many of whom may have different hygiene practices and different levels of cleanliness, or who may sweat to various degrees. These factors appear relevant to public health as pathogenic microorganisms are thought to exist on inanimate surfaces for prolonged periods of time, suggesting that gym-goers may have heightened pathogenic exposure risk. Public concerns over the cleanliness of exercise environments have contributed to frequent usage of cleaning products, which have further modified the microbial communities found in these environments as well as their permanence. Given that more people spend their time in indoor or built environments, and that such indoor environments can have reduced microbial diversity, this may lead to decreased skin microbial diversity as well.

Exposure to a greater repertoire of beneficial microorganisms can help improve occupants' physical and mental wellbeing and it can be beneficial to find a way to diversify the repertoire of beneficial microorganisms in indoor environments such as homes, offices, fitness facilities and studios, while suppressing the growth of pathogenic or harmful microorganisms. Greater repertoire and growth of beneficial microorganisms can suppress the growth of pathogenic or harmful microorganisms by, for example, making a certain bio-system less hospitable for disease causing organisms through nutrient consumption, for example, leaving less nutrients for pathogens, making conditions, such as, for example, pH, or products that are toxic or harmful for pathogens, or occupying binding sites so that less space is available for pathogens.

Thus, there remains a need for exercise equipment, such as mats or other surfaces, that manipulate or modify the microbiome of the environment adjacent to or in contact with the mat or surface.

SUMMARY

In one aspect, a mat is provided. The mat may comprise a body with a first surface and a second surface, and a microbial component that is dispersed in the body between the first and second surfaces, on one of the first surface or the second surface, or on both of the first surface and the second surface. The microbial component is configured to manipulate a microbiome of an environment adjacent to or in contact with the mat.

In another aspect, a mat is provided, the mat comprising a body comprising a first surface and a second surface, and a microbial component comprising pre-determined microorganisms, the microbial component being dispersed in the body between the first and second surfaces, on one of the first surface or the second surface, or on both of the first and the second surfaces, wherein the microbial component is configured to manipulate a microbiome of an environment adjacent to or in contact with the exercise mat.

In various embodiments, the microbial component comprises at least one of live bacteria, bacterial endospores, viruses, protozoa, fungi, algae, slime moulds, archaea, micro-plants, a synthetic biology system or microbial precursors dispersed on at least one of the first or second surfaces to engineer microbial compositions on the first surface, the second surface, or both the first and second surfaces. In various embodiments, the microbial component comprises at least one of live non-pathogenic bacteria, non-pathogenic bacterial endospores, live non-pathogenic fungi, fungal spores, viruses, protozoa, algae, slime mould, archaea, a micro-plant or a synthetic biology system.

In various embodiments, the microbial component is dispersed on at least a portion of at least one of the first surface or the second surface.

In various embodiments, the microbial component comprises microbial precursors configured to promote growth of the pre-determined microorganisms. For example, the microbial component may comprise bacterial precursors.

In various embodiments, the microbial component comprises microbial precursors configured to reduce growth of the pre-determined microorganisms.

In various embodiments, the microbial component comprises microbial precursors configured to enhance wild-type bacteria.

In various embodiments, the mat further comprises at least one microchannel formed in the body, the microbial component filling the at least one microchannel. The at least one microchannel may be formed on at least one of the first surface or the second surface. The pre-determined microorganisms may be grown in the at least one microchannel. In another example, the microbial component is affixed to the at least one microchannel.

In various embodiments, the microbial component cleans the mat by digesting secretions of a user.

In various embodiments, the microbial component is dormant. The microbial component may be activated by environmental stimuli, such as moisture, heat or pressure in contact with the microbial component. For example, the microbial component may release a scent upon activation. For example, the microbial component may emit light upon activation. For example, the microbial component may increase its volume upon activation.

In various embodiments, the microbial component is dispersed by spraying, coating, gluing, injecting, printing, chemical transfer or any combination thereof. For example, when the microbial component is a dispersion fluid, the microbial component is sprayed onto at least one of the first surface or the second surface.

In various embodiments, the first surface, the second surface or both the first and second surfaces are porous.

In addition to the aspects and embodiments described above, further aspects and embodiments will become apparent by reference to the following detailed description.

DETAILED DESCRIPTION OF SPECIFIC EMBODIMENTS

The present disclosure discloses an exercise surface, such as, for example, a yoga mat or an exercise mat, that contains beneficial microorganisms and/or their precursors, to confer favourable benefits to a user of the mat, or to a group of users in the vicinity of the mat. For the purpose of this disclosure, "precursors" refer to food sources, or other environmental conditions (such as, for example, moisture content, surface texture, UV-IR light spectrum, other microorganisms, temperature, or ions such as silver ions) that individually or collectively engineer a microbial composition on the exercise surface. For example, by adding a microbial component to the surface, either microorganisms and/or precursors, one can engineer the microbial composition of such surface to promote growth and persistence of specifically desired microorganisms. As a result, the composition of the microbiome in the environment of such a surface and/or users of such a surface is altered, either directly or indirectly by, for example, introducing live bacteria or providing the food for specific, desirable bacteria to grow. In various embodiments, by adding a microbial component to the exercise surface, microorganisms with targeted benefits can be introduced to the ecosystem. For example, microbes that are designed to perform a specific beneficial action to the human such as, for example, triggering a beneficial immune response in humans, can be added. The added microbial component can affect the whole microbial ecosystem, such as becoming a core part of the microbial ecosystem, or can be short-lived, delivering temporary effects before being outnumbered or outcompeted by other microbes.

The human microbiome is associated with many beneficial physiological effects. While most attention is focused on the gut microbiome, the skin also has a microbiome that can elicit physiological effects. The microbial load and diversity of a surface are considered important to hygiene and diversification of the indoor or built environment microbiome. Given that gyms, fitness studios and yoga studios are frequented by multiple individuals, building a healthy and diverse microbiome in such indoor environments may be beneficial for the users of such studios and the community in general.

The present disclosure describes an exercise surface, such as a yoga mat or an exercise mat, that contains pre-determined desired microbiome such as bacterial endospores, live bacteria, bacterial precursors, fungi, viruses, protozoa, algae, microbial precursors or a combination thereof in order to engineer and/or manipulate the microbial environment of the user and the yoga studio environment for favourable effects including the cleanliness, hygiene, wellbeing and health of the users and the environment. During a yoga class for example, frequent physical contact between the individual and their yoga mat will lead to positive or favourable change in the microbial inhabitants of the skin. Prolonged physical contact between the mat and the studio floor surface will also lead to a positive or favourable change in the microbial inhabitants of the studio. This can provide favourable manipulation of the user's skin microbiome to increase his/her microbial diversity as well as affect the microbial population in the studio environment, either for a short or long period of time. In addition, during movement of the user(s) on the exercise surface, such as a mat, the beneficial microorganisms from the microbial composition can be dispersed into the environment surrounding the mat and/or inhaled by the user(s).

For the purpose of this disclosure, the term "mat" is defined as any kind of mat, exercise mat, yoga mat, cushion, blanket, floor, ball or any other prop used for any kind of fitness or exercise. The mat of the present invention can comprise a body with a first surface on which the user can bring a portion of his/her body into contact with and a second surface that is in contact with an environment (for example, a studio floor) or vice versa, where the first surface can be in contact with the floor while the second surface can be in contact with the user. A microbial component that comprises at least one of desired live bacteria, bacteria endospores, bacterial or other microbial precursors, fungi, fungal spores viruses, protozoa, algae, slime moulds, archaea, micro-plants, a synthetic biology system, or any combination thereof is dispersed in the body of the mat between the first and second surfaces, on one of the first surface or the second surface, or on both of the first surface and the second surface. The term "synthetic biology system" refers an operational biological system developed from constituent parts such as DNA, proteins and other organic molecules. The microbial component may be on a portion of the first surface or the second surface, or on a portion of both the first and second surfaces. One or both of the first and second surfaces may be porous. In other embodiments, one or both of the first and second surfaces may be non-porous.

The microbial component may comprise one or more microorganisms. The microorganisms may comprise one or more of bacteria, fungi, slime moulds, archaea, protists, algae, micro-plants, micro-animals, a synthetic biology system comprising the abovementioned microorganisms, and organs thereof such as mycelium, spores, seeds, regenerative cells, embryos or combinations thereof. The bacteria may be nitrifying bacteria, bioluminescent bacteria, scent bacteria, cyanobacteria, actinobacteria or combinations thereof. The nitrifying bacteria may be ammonia-oxidizing bacteria (AOB) such as $N.$ $eutropha$ D23, having ATCC accession number PTA-121157, or nitrite-oxidizing bacteria (NOB). The bioluminescent bacteria may be photohabdus, shewanella, aliivibrio, photobacterium, vibrio, candidatus photodesmus or combinations thereof. The scent bacteria may be *Pseudomonas aeruginosa, Staphylococcus lugdenensis, Streptococcus anginosus, Escherichia coli, Haemophilus influenzae, Candida*/Yeast, *Proteus* spp, Actinomycetes, *Streptomyces, Nocardia* spp, *Alcaligenes faecalis, Achromobacter xylosoxidans, Clostridium difficile* or combinations thereof. The fungi may be *Penicillium*, Saprobic fungi or combinations thereof. The archaea may be Haloarchaea, Methanogens or combinations thereof. The protist may be coccolithophore, dinoflagellate or combinations thereof. The algae may be microalgae, green algae, red algae or combinations thereof. The micro-plants may be mosses, hornworts, liverworts or combinations thereof. The micro-animals may be nematodes, protozoa and rotifers, tardigrades, Loricifera or combinations thereof. An example of the synthetic biology system of microorganisms is lichen: a symbiosis of fungi and algae or cyanobacteria.

The microbial component can include commensal bacteria, such as the gram-positive bacteria *Staphylococcus Epidermis*, ammonia-oxidising bacteria, strains from the *bacillus* genus, such as *B. atrophaeus, B. subtilis, B. cereus, B. megaterium, B. thuringiensis*, or *B. stearothermophil*, gram-negative bacteria *Veillonella*, gram-positive bacterial spores, bacterial spores of at least one species of *Bacillus*, which can be from the group of *B. amyloliquefaciens, B. tequilensis, B. subtilis, B. atrophaeus, B. vallismortis, B. mojavensis* or any microbial precursors thereof, or any combinations thereof. The microbiome component can also comprise bacterial food sources of the desired bacterial species. For example, the microbiome component may comprise ammonia, ammonium salts, or urea, for growing ammonia-oxidizing bacteria. In various embodiments, the microbiome component can also comprise bacteriophages which may target specific bacteria and prevent their growth, or add functionality to native- or wild-type species to live on a desired surface. Introduction of beneficial microbes in the mat may diversify the skin microbiome of the user of such a mat and hence improve skin health of such a user while preventing pathogenic invasions in the mat or on the user's skin.

In one embodiment, a dispersion of the microbiome component can be uniformly sprayed onto the first and/or the second surface of the mat. For example, the microorganisms can be dispersed in a suitable liquid medium, such as water, or a foam medium and can be directly sprayed onto one or both of the surfaces of the mat so that the microorganisms can come in contact with the skin of a person using the mat or the microorganisms can be dispersed into the environment surrounding the mat and/or inhaled by the user(s).

In one embodiment, the microbial component can be coated onto the mat. For example, a layer of coating medium, such as a polyurethane, an acrylic, natural or synthetic rubber or any other suitable coating medium, containing the microbial component can be coated on the surface(s) of the mat using any suitable known coating techniques. The coating can be applied as liquid or gas coating or in some embodiments as a solid coating, such as, for example, a film of the microbial component. The coating layer can be thin and porous, such that the bacteria can still have direct contact to the user and even though the bacteria are embedded in or under the coating layer, they can easily migrate through the coating layer and get access to the user's skin. In some embodiments, the bacteria can colonize and spread to the surface of the mat slowly or they can stay in and below the coating layer and can act to reduce the odors that develop when sweat diffuses into the mat between the first and second surfaces.

In some embodiments, the microorganisms (with or without a dispersion medium, a carrier medium or a coating medium) can be sprayed on the surface(s) of the mat and then the mat can be coated with a coating medium.

In various embodiments, the microbial component may be printed on the mat surface(s). For example, an ink containing the desired beneficial microorganisms and/or their precursors can be printed onto the mat's surfaces in a designed pattern. In one embodiment, microorganisms can be printed onto a transfer media and then transferred onto the surface of the mat by, for example, direct gluing, heating, UV or chemical transfer. The microorganisms can be printed, coated or embedded in a matrix with a binding media, for example, a transferring paper, and then transferred onto the mat.

In another embodiment, the microbial component can be injected or embedded into the body of the mat. The microbial component may be dispersed in the body between the first and second surfaces. The mat may comprise at least one microchannel that is formed in the body. For example, such microchannels can be formed or embedded in the body with no direct exposure to air or can be formed or textured on at least one of the mat's surfaces. The at least one microchannel can be filled with the microbial component by injection, gluing or growth. For example, the desired microorganisms can be grown by providing predetermined precursors in the microbial component that support growth of the desired microorganisms. The growth of the desired microorganisms is then guided and stimulated by certain stimuli such as, for example, one provided by the individual. For example, the stimulus may be the presence or amount of moisture, temperature, pressure or a combination thereof. In one embodiment, microbial growth can be guided using other stimuli or sources such as lighting (for example. certain light exposure at specific wavelengths), electrical (voltage) pulses or a magnetic field exposure. Such stimuli can be embedded into the mat so that the stimulus or stimuli are internal, for example, a light source (such as one or more LEDs) or a power source (such as batteries) can be embedded into the mat, or the stimuli can be external to the mat (for example, lighting or temperature in the studio). In further embodiments, the stimuli may be a combination of internal and external stimuli.

In one embodiment, a template can be formed on the surface of the mat, and then the microorganisms can grow or be assembled within the templates. Once the microorganisms have grown or are transferred on the mat, the templates can be removed and in some cases kept for later.

In one embodiment, microorganisms can be spun into fibers or nanofibers and then surface-coated onto the first and/or second surfaces or embedded into the mat between the first and second surfaces. In one implementation, such biofiber can be used as a biosensor (e.g., Logiclink™) for providing a number of biometric measurements.

By providing a mat with a beneficial, desired and controlled microbial component, one can manipulate microbial communities on the individual's skin, increase the diversity and health of individual's microbiome as well as manipulate the microbiome of a particular environment (for example, the microbiome of the fitness studio), so that such an indoor environment has microbiome more similar to the outdoor environment. In addition, the applied or embedded microorganisms can have cleaning functions. For example, the microorganisms may clean the mat itself or the user of the mat by digesting sweat secretions.

In various embodiments, at least part of the microbial component can be dormant microorganisms that can be activated when exposed to an activating actuator, such as, for example, an increased moisture content (for example, by sweating), temperature (for example, body temperature), pressure, ions (such as, for example, from sweat), or any combination thereof. Once activated, such microorganisms can start their function such as, for example, digesting or cleaning sweat secretions. In one embodiment, when the microorganisms are activated, for example, when the bacterial spores get wet and are activated, they can expand and improve the friction of the mat (improve the wet gripping) by creating a rougher surface, or the mat can swell (due to the microorganisms' activation), providing cushioning (pressure reduction) for the user. When the actuators are removed (for example, by drying the mat), the microorganisms can go dormant again, reversing their effect, for example, the mat can shrink again.

In one embodiment, the microbiome component can release different scents upon activation and trigger different sensory states (for example, calm, energized, etc.). In one embodiment, only a first portion of the microorganisms in the microbial component can be activated (depending on the actuator) while a second portion can remain dormant. In one embodiment, additional external actuators can be provided to activate the first or second portions of the microorganisms in the microbiome component. For example, the first portion of the microorganisms can be activated by the individual's sweat or pressure to provide scent that will energize the individual, and then toward the end of the workout the mat can be exposed to light (for example, filtered light) to activate the microorganisms contained in the microbiome component that will release scent that is more calming for the individual. In some embodiments, the microorganisms in the microbiome component can emit light (bioluminescence) upon activation and therefor provide information of movement direction, for example.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the disclosure described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

What is claimed is:

1. An exercise, fitness or yoga mat comprising:
a body comprising a first surface and a second surface;
a microbial component comprising pre-determined microorganisms, the microbial component being dispersed in the body between the first and second surfaces, on one of the first surface or the second surface, or on both of the first surface and the second surfaces, wherein the pre-determined microorganisms are comprised of at least one of live non-pathogenic bacteria, non-pathogenic bacterial endospores and/or live non-pathogenic fungi, and
wherein the microbial component is configured to manipulate a microbiome of an environment adjacent to or in contact with the exercise, fitness or yoga mat.

2. The mat of claim 1, wherein the microbial component is dispersed on at least a portion of at least one of the first surface or the second surface.

3. The mat of claim 1, wherein the microbial component further comprises microbial precursors configured to promote growth of the pre-determined microorganisms.

4. The mat of claim 1, wherein the microbial component further comprises microbial precursors configured to reduce growth of the pre-determined microorganisms.

5. The mat of claim 1, wherein the microbial component further comprises microbial precursors configured to enhance wild-type non-pathogenic bacteria.

6. The mat of claim 3, wherein the microbial precursors comprises food sources.

7. The mat of claim 1, further comprising at least one microchannel formed in the body, the microbial component filling the at least one microchannel.

8. The mat of claim 7, wherein the at least one microchannel is formed on at least one of the first surface or the second surface.

9. The mat of claim 8, wherein the pre-determined microorganisms are grown in the at least one microchannel.

10. The mat of claim 8, wherein the microbial component is affixed to the at least one microchannel.

11. The mat of claim 1, wherein the microbial component cleans the mat by digesting secretions of a user.

12. The mat of claim 1, wherein the microbial component is dormant.

13. The mat of claim 12, wherein the microbial component is activated by moisture, heat or pressure in contact with the microbial component.

14. The mat of claim 13, wherein the microbial component releases scent upon activation.

15. The mat of claim 13, wherein the microbial component emits light upon activation.

16. The mat of claim 13, wherein the microbial component increase its volume upon activation.

17. The mat of claim 1, wherein the microbial component is dispersed by spraying, coating, gluing, injecting, printing, chemically transferring or any combination thereof.

18. The mat of claim 17, wherein the microbial component is a dispersion fluid, the microbial component being sprayed onto at least one of the first or second surface.

19. The mat of claim 1, wherein the first surface, the second surface, or both the first and second surfaces are porous.

\* \* \* \* \*